US009164281B2

(12) United States Patent
Hing et al.

(10) Patent No.: US 9,164,281 B2
(45) Date of Patent: Oct. 20, 2015

(54) VOLUMETRIC HEADS-UP DISPLAY WITH DYNAMIC FOCAL PLANE

(71) Applicants: Honda Motor Co., Ltd., Tokyo (JP); Making Virtual Solid—California, LLC, San Jose, CA (US)

(72) Inventors: Victor Ng-Thow Hing, Sunnyvale, CA (US); Tom Zamojdo, San Jose, CA (US); Chris Grabowski, San Jose, CA (US)

(73) Assignees: Honda Motor Co., Ltd., Tokyo (JP); Making Virtual Solid—California, LLC, San Jose, CA (US)

( * ) Notice: Subject to any disclaimer, the term of this patent is extended or adjusted under 35 U.S.C. 154(b) by 219 days.

(21) Appl. No.: 13/832,918

(22) Filed: Mar. 15, 2013

(65) Prior Publication Data
US 2014/0267402 A1  Sep. 18, 2014

(51) Int. Cl.
G02B 27/01  (2006.01)

(52) U.S. Cl.
CPC ............ *G02B 27/01* (2013.01); *G02B 27/0101* (2013.01); *G02B 2027/014* (2013.01); *G02B 2027/0127* (2013.01); *G02B 2027/0154* (2013.01)

(58) Field of Classification Search
CPC .................. G06F 3/04886; G02B 2027/0114; G02B 27/106; G02B 27/01; G02B 27/18; G01C 21/3629; G02F 1/1313; G02F 1/13725
USPC ............. 345/633, 7, 8; 359/630, 13; 701/409, 701/41, 532, 31.4, 533; 353/94, 3, 13
See application file for complete search history.

(56) References Cited
U.S. PATENT DOCUMENTS

| 5,051,735 A | 9/1991 | Furukawa |
| 5,115,398 A | 5/1992 | De Jong |

(Continued)

FOREIGN PATENT DOCUMENTS

| DE | 10130046 | 1/2003 |
| DE | 102012210145 | 7/2009 |

(Continued)

OTHER PUBLICATIONS

Office Action of U.S. Appl. No. 13/832,209 dated Jan. 30, 2015, 26 pages.

(Continued)

*Primary Examiner* — Scott J Sugarman
*Assistant Examiner* — Journey Sumlar
(74) *Attorney, Agent, or Firm* — Rankin, Hill & Clark LLP

(57) ABSTRACT

A heads-up display device for displaying graphic elements in view of a user while the user views an environment through a display screen. The heads-up display device includes at least one projector that projects a graphic element on a frontal focal plane in view of the user while the user views the environment through the display screen, and at least one projector that projects a graphic element on a ground-parallel focal plane in view of the user while the user views the environment through the display screen. The projector that projects the graphic element on the frontal focal plane is mounted on an actuator that linearly moves the projector so as to cause the frontal focal plane to move in a direction of a line-of-sight of the user. The projector that projects the ground-parallel focal plane is fixedly arranged such that the ground-parallel focal plane is static.

20 Claims, 4 Drawing Sheets

(56) References Cited

U.S. PATENT DOCUMENTS

| | | | |
|---|---|---|---|
| 5,368,309 A | 11/1994 | Monroe et al. | |
| 5,440,428 A | 8/1995 | Hegg et al. | |
| 5,519,536 A | 5/1996 | Hoehn | |
| 6,285,317 B1 | 9/2001 | Ong | |
| 6,574,555 B2 | 6/2003 | Mochizuki et al. | |
| 6,708,087 B2 | 3/2004 | Matsumoto | |
| 6,735,517 B2 | 5/2004 | Engelsberg et al. | |
| 6,774,772 B2 | 8/2004 | Hahn | |
| 6,947,064 B1 | 9/2005 | Hahn et al. | |
| 7,124,027 B1 | 10/2006 | Ernst | |
| 7,190,260 B2 | 3/2007 | Rast | |
| 7,216,035 B2 | 5/2007 | Hortner et al. | |
| 7,379,813 B2 | 5/2008 | Kubota | |
| 7,519,471 B2 | 4/2009 | Shibata et al. | |
| 7,565,230 B2 | 7/2009 | Gardner et al. | |
| 7,627,419 B2 | 12/2009 | Yoshida | |
| 7,647,170 B2 | 1/2010 | Sawaki et al. | |
| 7,783,422 B2 | 8/2010 | Tanaka | |
| 7,815,313 B2 | 10/2010 | Ito et al. | |
| 7,920,102 B2 | 4/2011 | Breed | |
| 8,135,536 B2 | 3/2012 | Matsunaga et al. | |
| 8,208,208 B2 * | 6/2012 | Schwab | 359/704 |
| 8,305,444 B2 | 11/2012 | Hada | |
| 8,352,181 B2 | 1/2013 | Hagiwara | |
| 8,358,224 B2 | 1/2013 | Seder et al. | |
| 8,406,990 B2 | 3/2013 | Barkowski et al. | |
| 8,411,245 B2 | 4/2013 | Lee et al. | |
| 8,620,575 B2 | 12/2013 | Vogt et al. | |
| 8,633,810 B2 | 1/2014 | Luo et al. | |
| 8,633,979 B2 | 1/2014 | Szczerba et al. | |
| 8,660,735 B2 | 2/2014 | Tengler et al. | |
| 8,686,872 B2 | 4/2014 | Szczerba et al. | |
| 8,686,922 B2 | 4/2014 | Breed | |
| 8,725,342 B2 | 5/2014 | Ferguson et al. | |
| 2005/0071082 A1 | 3/2005 | Ohmura et al. | |
| 2005/0195383 A1 | 9/2005 | Breed et al. | |
| 2006/0262140 A1 | 11/2006 | Kujawa et al. | |
| 2008/0046150 A1 | 2/2008 | Breed | |
| 2008/0318676 A1 | 12/2008 | Ham | |
| 2009/0005961 A1 * | 1/2009 | Grabowski et al. | 701/200 |
| 2009/0210257 A1 | 8/2009 | Chalfant et al. | |
| 2009/0268946 A1 | 10/2009 | Zhange et al. | |
| 2010/0201894 A1 * | 8/2010 | Nakayama et al. | 348/745 |
| 2010/0253492 A1 | 10/2010 | Seder et al. | |
| 2010/0253601 A1 | 10/2010 | Seder et al. | |
| 2010/0292886 A1 * | 11/2010 | Szczerba et al. | 701/29 |
| 2010/0332266 A1 | 12/2010 | Tamir et al. | |
| 2011/0018903 A1 | 1/2011 | Lapstun et al. | |
| 2011/0075257 A1 | 3/2011 | Hua et al. | |
| 2011/0106428 A1 | 5/2011 | Park et al. | |
| 2011/0199376 A1 | 8/2011 | Saleman | |
| 2012/0019557 A1 | 1/2012 | Aronsson et al. | |
| 2012/0041632 A1 | 2/2012 | Bordes | |
| 2012/0072105 A1 | 3/2012 | Feyereisen et al. | |
| 2012/0154441 A1 | 6/2012 | Kim | |
| 2012/0162255 A1 | 6/2012 | Ganapathy et al. | |
| 2012/0173069 A1 | 7/2012 | Tsimhoni et al. | |
| 2012/0212405 A1 | 8/2012 | Newhouse et al. | |
| 2012/0224060 A1 | 9/2012 | Gurevich et al. | |
| 2012/0249589 A1 | 10/2012 | Gassner et al. | |
| 2012/0283942 A1 | 11/2012 | T'Siobbel et al. | |
| 2012/0310531 A1 | 12/2012 | Agarwal et al. | |
| 2013/0050258 A1 | 2/2013 | Liu et al. | |
| 2013/0083291 A1 * | 4/2013 | Smithwick et al. | 353/7 |
| 2013/0151145 A1 | 6/2013 | Ishikawa | |
| 2013/0261871 A1 | 10/2013 | Hobbs et al. | |
| 2013/0262997 A1 | 10/2013 | Markworth et al. | |
| 2014/0005857 A1 | 1/2014 | Heisterkamp | |
| 2014/0019913 A1 | 1/2014 | Newman et al. | |
| 2014/0063064 A1 | 3/2014 | Seo et al. | |
| 2014/0139524 A1 | 5/2014 | Nilsson et al. | |
| 2014/0267263 A1 | 9/2014 | Beckwith et al. | |
| 2014/0267398 A1 * | 9/2014 | Beckwith et al. | 345/633 |

FOREIGN PATENT DOCUMENTS

| | | |
|---|---|---|
| DE | 102009045169 | 3/2011 |
| EP | 1862988 | 11/2009 |
| EP | 2618108 | 7/2013 |
| JP | 2006309552 | 11/2006 |
| WO | 2010040589 | 4/2010 |
| WO | 2011108091 | 9/2011 |

OTHER PUBLICATIONS

Website: "BMW Technology Guide: Adaptive Brake Assistant" http://www.bmw.com/com/en/insights/technology/technology_guide/articles/adaptive_brake_assistant.html, printed Oct. 17, 2014.

Website: "Adaptive Cruise Control and Collision Warning with Brake Support" http://corporate.ford.com/doc/Adaptive_Cruise.pdf, Jul. 2012.

Article: Alves, P.R. et al. "Forward Collision Warning Systems Using Heads-up Displays: Testing Usability of Two New Metaphors", Intelligent Vehicles Symposium (IV), 2013 IEEE, pp. 1-6, http://ueeexplore.ieee.org/xpl/login.jsp?tp=&arnumber=6629438&url=htp%3A%2F%2Fieeexplore.ieee.org%2Fstamp%2Fstamp.jsp%3Ftp%3D%26arnumber%3D6629438.

Article: Ho, C. et al. "Multisensory In-Car Warning Signals for Collision Avoidance" Human Factors: The Journal of the Human Factors and Ergonomics Society, 49(6), 1107-1114, Dec. 2007, http://www.ncbi.nlm.nih.gov/pubmed/18074709.

Article: Gray R. et al. "A Comparison of Different Informative Vibrotactile Forward Collision Warnings: Does the Warning Need to Be Linked to the Collision Event?", PloS One, 9(1), e87070, Jan. 27, 2014, http://www.plosone.org/article/info%3Adoi%2F10.1371%2Fjournal.pone.0087070.

Article: Tai et al. "Bridging the Communication Gap: A Driver-Passenger Video Link" dated Apr. 15, 2010, https://www.pervasive.wiwi.uni-due.de/uploads/tx_itochairt3/publications/Bridging_the_Communication_Gap-MC2009-GraceTai_01.pdf.

Website: "Future Car Technologies" dated Dec. 19, 2013, http://www.carcoversdirect.com/car-lovers-resources/fact-friday/future-car-technologies/#.U3uVbPldVJ1.

Office Action of U.S. Appl. No. 14/041,614 dated Dec. 23, 2014.

Autoblog, GM's Full-Windshield HUD Technology | Autoblog, YouTube, Mar. 17, 2010, http://www.youtube.com/watch?v=wR5EAGM4-U&feature=youtu.be&t=1ml5s.

MVS California, 2_Working_Demo.mov, YouTube, May 16, 2011, http://www.youtube.com/watch?v=pdtcyaF6bTl.

Office Action of U.S. Appl. No. 14/041,614 dated May 6, 2015.

Office Action of U.S. Appl. No. 13/832,209 dated Jul. 16, 2015, 37 pages.

* cited by examiner

VOLUMETRIC HEADS-UP DISPLAY WITH DYNAMIC FOCAL PLANE

BACKGROUND

To improve driver convenience, a vehicle may be a provided with a heads-up display (HUD) which displays information to the driver. The information displayed by the HUD may be projected onto the windshield of the vehicle so as to present the information in the driver's view while the driver is driving. By displaying the information in the driver's view, the driver does not need to look away from the windshield (e.g., toward an instrument display on a center dashboard) while driving to see the presented information.

The HUD may present vehicle information typically displayed in the vehicle's center dashboard, such as information related to the vehicle's speed, fuel level, engine temperature, etc. Additionally, the HUD may also present map information and communication events (e.g., navigation instructions, warnings and alerts, etc.) to the driver. The vehicle HUD may present the information to the driver in a manner similar to that employed by the vehicle dashboard, such as by displaying gauges and text boxes which appear as graphic elements on the windshield. Additionally, the vehicle HUD may present augmented reality graphic elements which augment a physical environment surrounding the vehicle with real-time information.

However, existing HUD devices used in vehicles may not be capable of presenting augmented reality graphic elements with consistent depth cues. A similar shortcoming may also be provided by HUD devices provided in stationary bases. Accordingly, augmented reality graphic elements presented by existing (vehicle) HUDs may be presented as superficial overlays.

BRIEF DESCRIPTION

According to one aspect, a heads-up display device for displaying graphic elements in view of a user includes a first projector and a first actuator. The first projector is configured to project a first graphic element on a first focal plane in view of the user. The first focal plane is oriented substantially perpendicularly to a line-of-sight of the user. The first projector is mounted on the first actuator. The first actuator is configured to linearly move the first projector. Linearly moving the first projector causes the first focal plane of the first graphic element to move in a direction of the line-of-sight of the user.

According to another aspect, a vehicular heads-up display system includes a vehicle heads-up display device and a controller. The vehicle heads-up display device displays graphic elements in view of a driver of a vehicle, and includes a first projector and a second projector. The first projector is configured to project a first graphic element on a first focal plane in view of the driver. The first focal plane is oriented substantially perpendicularly to a line-of-sight of the driver. The first projector is configured to move the first focal plane in a direction of the line-of-sight of the driver. The second projector is configured to project a second graphic element on a second focal plane in view of the driver. The second focal plane is static and oriented substantially parallel to a ground surface. The controller is configured to communicate with at least one associated vehicle control system and to control the vehicle heads-up display device to display the first and second graphic elements based on communication with the at least one associated vehicle control system.

According to yet another aspect, a method for presenting augmented reality graphic elements in a heads-up display includes projecting a first graphic element on a first focal plane in view of a user, and a second graphic element on a second focal plane in view of the user. The first focal plane is oriented substantially perpendicularly to a line-of-sight of the user, and the second focal plane is static and oriented substantially parallel to a ground surface. The method also includes moving the first focal plane in a direction of the line-of-sight of the user.

DETAILED DESCRIPTION

Graphic elements visually placed on environmental elements in the direct view of a user by a HUD device are called contact-analog or conformal augmented reality graphic elements. Successfully presenting contact-analog augmented reality graphic elements to the user of the HUD device depends on the ability of the HUD device to correctly reproduce depth cues. The depth cues include accommodation and vergence. Accommodation is a depth cue where the muscles in the eye actively change the optical power to change focus at different distances. Vergence is the simultaneous inward rotation of the eyes towards each other to maintain a single binocular image when viewing an object.

When a HUD device displays a graphic element on a display screen (e.g., a windshield of a vehicle when the HUD device is provided in a vehicle), accommodation may cause the human eye to shift between environmental elements and information displayed by the HUD device. Vergence may cause the eyes to converge to points beyond the display screen (windshield) into the environment, which may lead to the appearance of a double image of the HUD graphic element displayed on the display screen (windshield). Accordingly, to render contact-analog augmented reality graphic elements with correctly reproduced depth cues, the graphic elements should be rendered into the same space as the real environment, rather than on the display screen (windshield of the vehicle).

Figure 1:
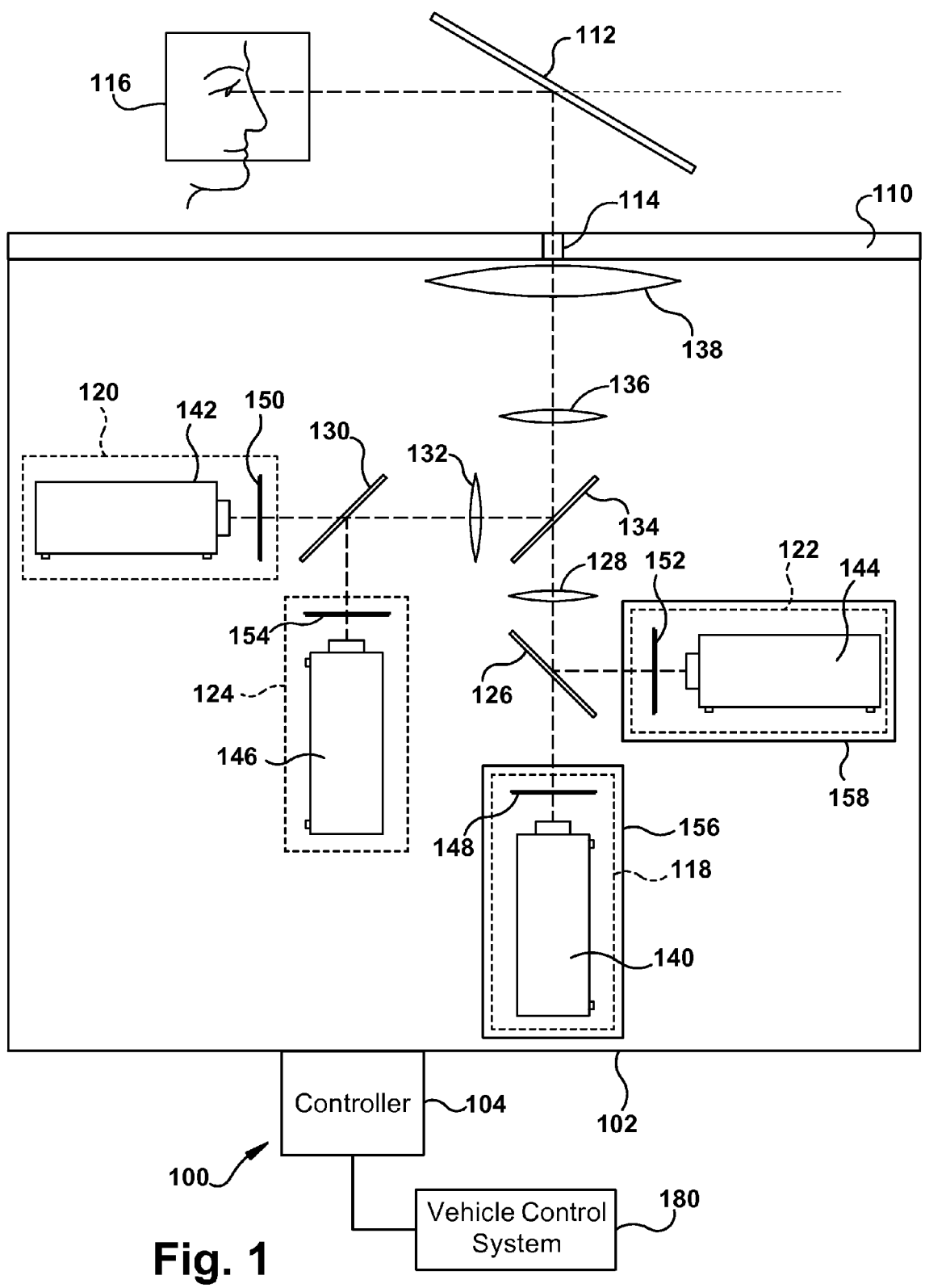
FIG. 1 is a block schematic showing a heads-up display system.
Figure 2:
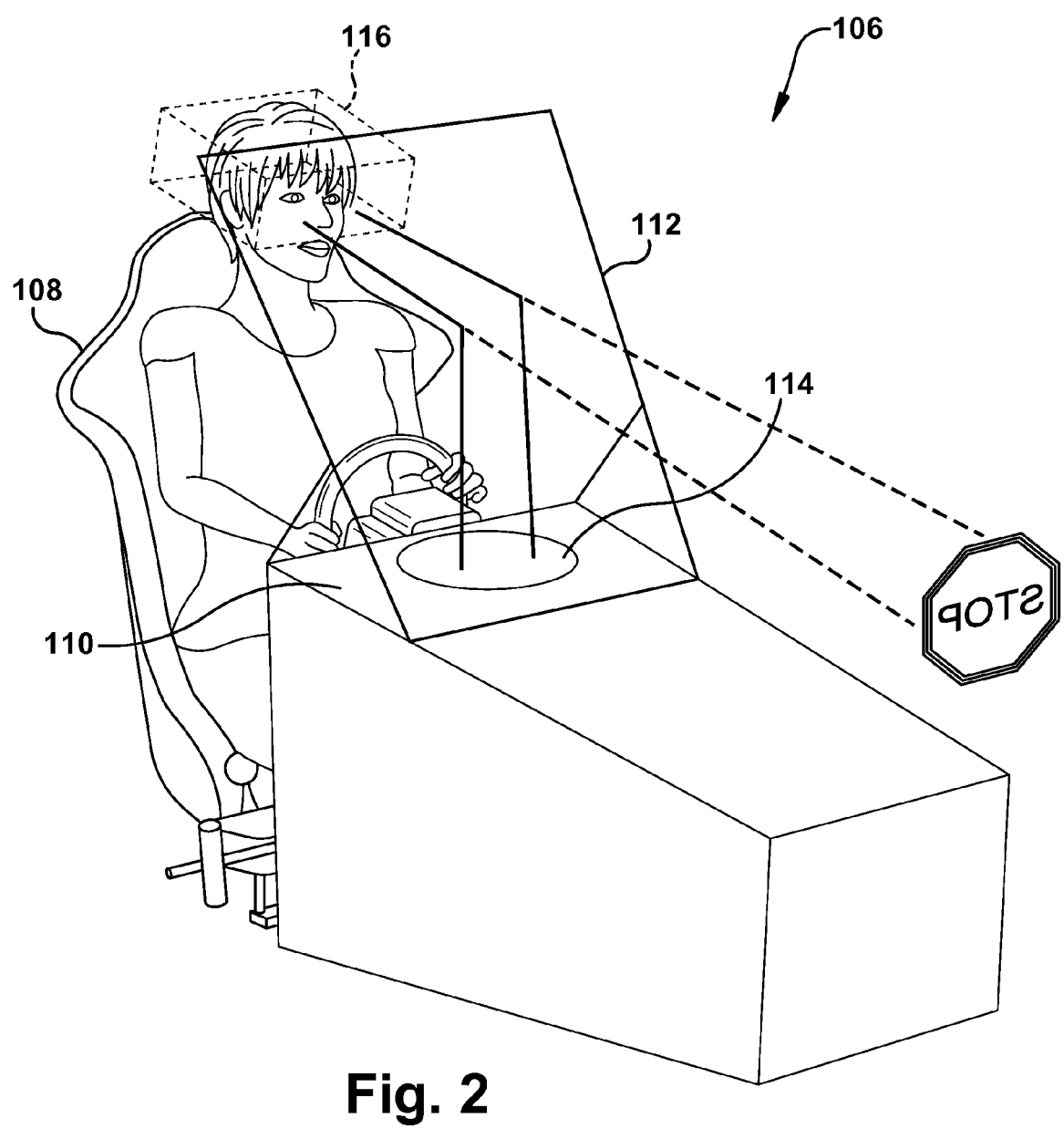
FIG. 2 is a schematic illustration of a vehicle or stationary base in which the heads-up display system is provided.

Referring to FIG. 1, a volumetric heads-up display system 100 ("HUD system 100") capable of rendering volumetric contact-analog augmented reality graphic elements (i.e., 3-dimensional graphic elements rendered into the same space as the real environment) with correctly reproduced depth cues is shown. The HUD system 100 includes a heads-up display device 102 ("HUD device 102") and a controller 104. Referring to FIG. 2, the HUD system 100 may be provided in a vehicle 106, which includes a driver seat 108, a dashboard enclosure 110, and a windshield 112. While the HUD system 100 is described below as being a vehicular HUD system 100, wherein the user is a driver and the display screen is the windshield 112, it is to be appreciated that the HUD system 100 may be provided on a stationary base (e.g., within a room, etc.). In such a configuration, FIG. 2 may be considered to show the stationary base of the HUD system 100, wherein 106 references a seat (rather than a driver seat) and element 112 references a display screen (rather than a windshield).

The configuration of the vehicle 106, particularly with respect to the relative positioning of the driver seat 108, dashboard enclosure 110, and windshield 112, may be conventional. To accommodate the herein-described HUD system 100, the dashboard enclosure 110 defines a housing space in which the HUD system 100 is housed. Furthermore, the dashboard enclosure 110 has a HUD exit aperture 114 defined through an upper surface thereof. The HUD system 100 housed in the dashboard enclosure 110 projects graphic elements, such as contact-analog augmented reality graphic elements, through the HUD exit aperture 114 to the windshield 112, which may be used as a display screen for the HUD system 100. As described in further detail below, the augmented reality graphic elements are rendered to the driver as if in the same space as the real environment.

A driver of the vehicle 106 drives the vehicle 106 while seated in the driver seat 108. Accordingly, the driver may be positionally constrained to a seating position on the driver seat 108 within the vehicle 106. In view of this positional constraint, the HUD system 100 may be designed using an assumption that the driver's view originates from an eye box 116 within the vehicle. The eye box 116 may be considered to include a region of an interior of the vehicle 106 where the driver's eyes are situated while the driver is seated in the driver seat 108.

The eye box 116 may be sized to encompass all possible head positions of the driver regardless of a position and posture of the driver seat 108, or the HUD system 100 may be configured to detect the position and posture of the driver seat 108, and to adjust a position and size of the eye box 116 based thereon. As a further alternative, the HUD system 100 may be designed assuming the eye box 116 has a fixed size and is in a fixed position. For example, the eye box may have the following dimensions: 20 cm×10 cm×10 cm. In any event, the HUD system 100 is configured to present the contact-analog augmented reality graphic elements to the driver when the driver's eyes are within the eye box 116 and the driver is facing/looking in a forward direction through the windshield 112 of the vehicle 106.

The HUD device 102 displays graphic elements in view of the driver of the vehicle 106 while the driver views an environment through the windshield 112 of the vehicle 106. Any graphic or environmental elements viewed by the driver through the windshield 112 while the driver's eyes are in the eye box 116 and the driver is facing/looking in the forward direction through the windshield 112 may be considered to be in view of the driver. As used herein, the view of the driver of the vehicle 106 while the driver views an environment through the windshield 112 of the vehicle 106 is intended to include an area viewed through the windshield 112, excluding dashboard displays located within the vehicle 106. In other words, the HUD device 102 presents the graphic elements such that the driver may view the graphic elements without looking away from the road.

Returning to FIG. 1, the HUD device 102 of the HUD system 100 includes a first projector 118, a second projector 120, a third projector 122, and a fourth projector 124. The first projector 118 and the third projector 122 share a first beam splitter 126 and a first objective lens 128, while the second projector 120 and fourth projector 124 share a second beam splitter 130 and a second objective lens 132. Consequently, the output of the first projector 118 and the third projector 122 is received in the first beam splitter 126 and combined into a singular output, which is directed to (and through) the first objective lens 128. Similarly, the output of the second projector 120 and the fourth projector 124 is received in the second beam splitter 130 and combined into a singular output, which is directed to (and through) the second objective lens 132.

The HUD device 102 further includes a third beam splitter 134 disposed downstream from the first and second objective lenses 128, 132 so as to receive the output from the first and second objective lenses 128, 132. The outputs from the first and second objective lenses 128, 132 are combined at the third beam splitter 134 into a singular output, which is a combination of the output of all of the first, second, third, and fourth projectors 118, 120, 122, 124, and directed to (and through) a third objective lens 136 and an ocular lens 138 before being directed out of the HUD exit aperture 114 to the windshield 112, which is used as the display screen for the HUD system 100.

Each of the first projector 118, the second projector 120, the third projector 122, and the fourth projector 124 include a projector unit 140, 142, 144, 146 and a diffuser screen 148, 150, 152, 154 rigidly fixed a set distance from the projector unit 140, 142, 144, 146 and arranged relative to the projector unit 140, 142, 144, 146 such that light emitted from the projector unit 140, 142, 144, 146 passes through the diffuser screen 148, 150, 152, 154. The projector units 140, 142, 144, 146 are each light-emitting units which project an image or graphic element that passes through the associated diffuser screen 148, 150, 152, 154. The diffuser screens 148, 150, 152, 154 serve luminous image source (or object) for the rest of the optical system of the HUD device 102, and ensure that much of the light leaving the diffuser screens 148, 150, 152, 154 falls into the optics following the diffuser screens 148, 150, 152, 154 (i.e., the first beam splitter 126, the first objective lens 128, the second beam splitter 130, the second objective lens 132, the third beam splitter 134, the third objective lens 136, and the ocular lens 138), while spreading out light so that it eventually fills out the eye-box 116 so that brightness of the image or graphic element(s) stays constant while the driver's head moves within the eye box 116. Accordingly, use of the diffuser screens 148, 150, 152, 154 substantially prevents different parts of the image or graphic element(s) from being visible from different points within the eye box 116, and thereby substantially prevents the occurrence of different visual behavior with slight head movement.

The projector units 140, 142, 144, 146 may take the form of any light-emitting unit suitable for the herein-described use. Particularly, the projector units 140, 142, 144, 146 may take the form of any light-emitting unit capable of projecting an image or graphic element according to the herein-described use(s). Similarly, the diffuser screens 148, 150, 152, 154 may take the form of any light diffusing screen suitable for the herein-described use(s).

The first projector 118 is mounted on a first actuator 156 in the HUD device 102. The first actuator 156 is a linear actuator capable of moving the first projector 118 in a linear direction toward and away from the first beam splitter 126. Additionally, the third projector 122 is mounted on a second actuator 158 in the HUD device 102. The second actuator 158 is a linear actuator capable of moving the third projector 122 in a linear direction toward and away from the first beam splitter 126. The first and second actuators 156, 158 may take the form of any linear actuators suitable for the herein-described use. The ability of the first projector 118 and the third projector 122 to linearly move allows the first projector 118 and the third projector 122 to project graphic elements on dynamic or movable focal planes. In contrast to the first and third projectors 118, 122, the second and fourth projectors 120, 124 are fixedly arranged in the HUD device 102, and therefore project graphic elements on static focal planes.

Using the first, second, third, and fourth projectors 118, 120, 122, 124, the HUD device 102 may render graphic elements (contact-analog augmented reality graphic elements or otherwise) in four distinct focal planes in the environment viewed by the driver through the windshield 112. In this regard, the first projector 118 is configured to project a first graphic element 160 in a first focal plane 162, the second projector 120 is configured to project a second graphic 164 element in a second focal plane 166, the third projector 122 is configured to project a third graphic element 168 in a third focal plane 170, and the fourth projector 124 is configured to project a fourth graphic element 172 in a fourth focal plane 174 (see FIGS. 3 and 4). All of the first, second, third, and fourth graphic elements 160, 164, 168, 172, and their associated first, second, third, and fourth focal planes 162, 166, 170, 174, are rendered in the environment in view of the driver when the driver is driving the vehicle 106 and the driver's eyes are in the eye box 116 while the driver is looking in the forward direction through the windshield 112.

Figure 3:
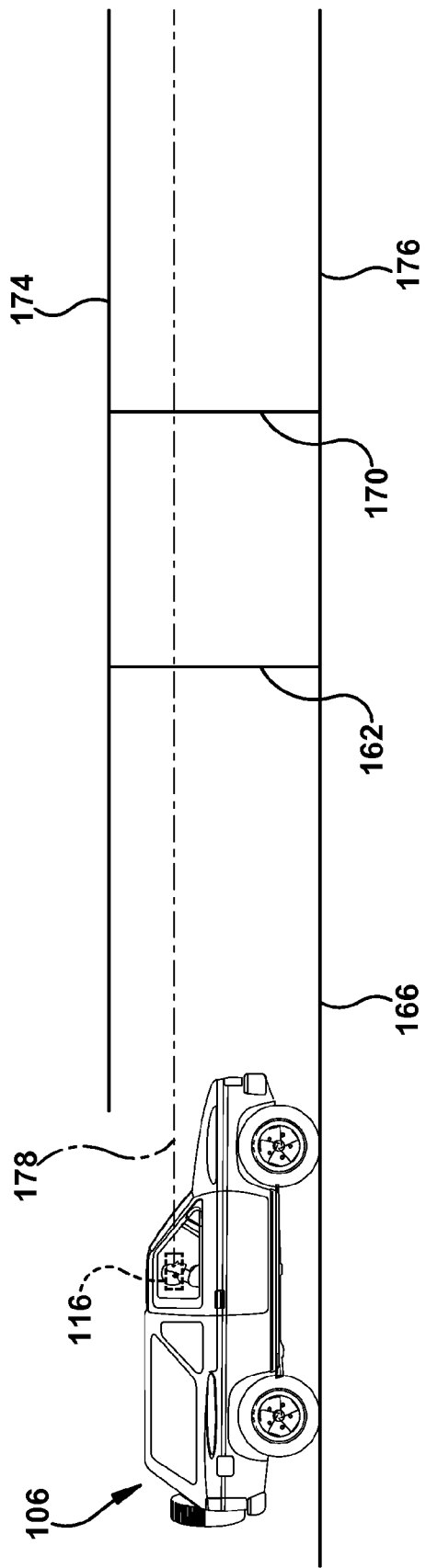
FIG. 3 is a side view of the vehicle which illustrates the four focal planes on which graphic elements are projected by the heads-up display system.
Figure 4:
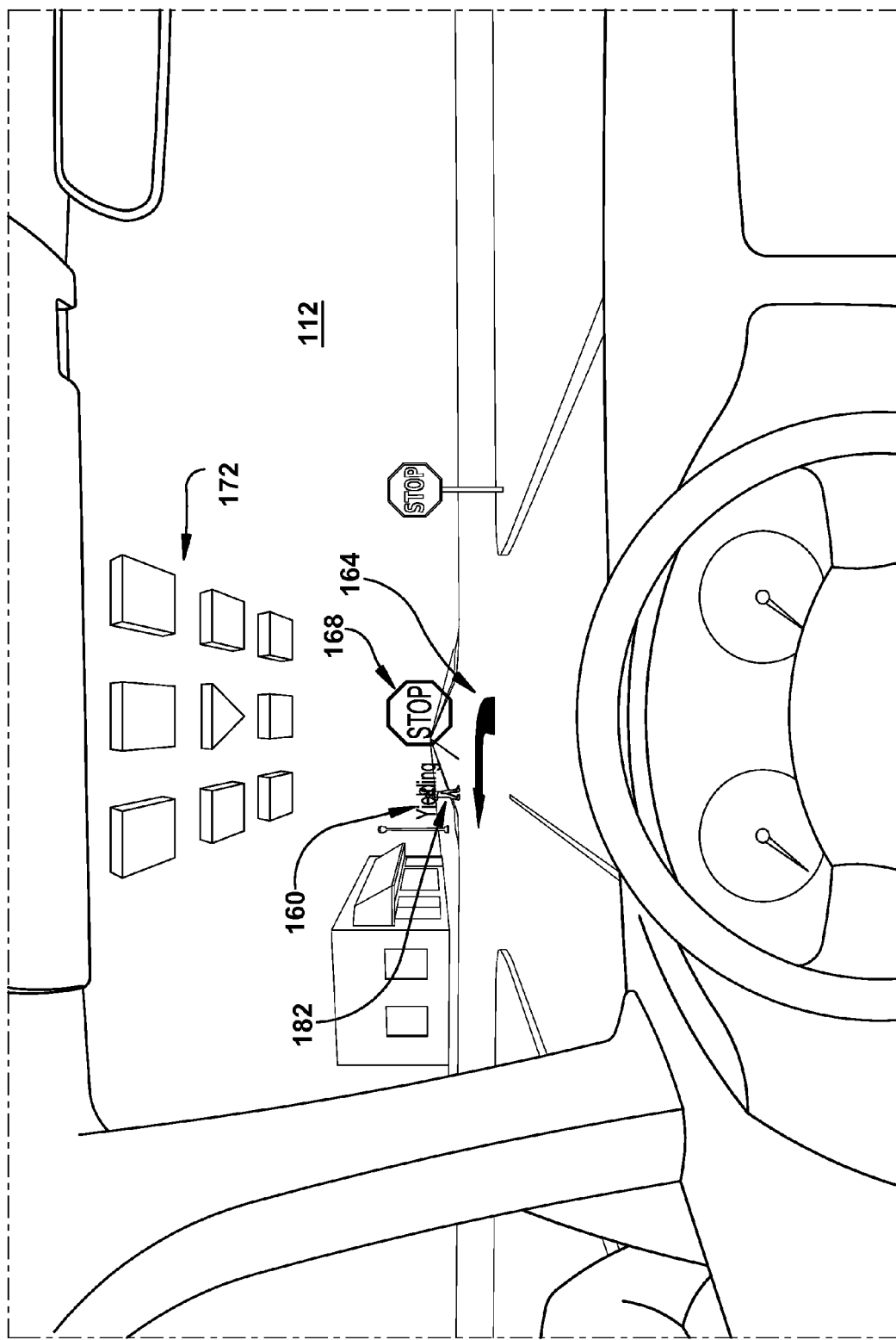
FIG. 4 illustrates an exemplary view of the user as a driver while driving a vehicle and looking through a windshield of the vehicle, and shows exemplary graphic elements projected by the heads-up display system.

Referring to FIGS. 3 and 4, the projection of the first, second, third, and fourth graphic elements 160, 164, 168, 172 on the first, second, third, and fourth focal planes 162, 166, 170, 174 will be described with reference to a ground surface 176 and a line-of-sight 178 of the driver. In this regard, the ground surface 176 is a surface of a road in front of the vehicle 106. For the purposes of the instant description, the ground surface 176 will be assumed to be a substantially planar surface. The line-of-sight 178 of the driver is a line extending substantially parallel to the ground surface 176 from the eye box 116 in the forward direction. As used herein, a direction of the line-of-sight 178 is a direction extending toward and away from the driver and the vehicle 106 along the line-of-sight 178.

The first focal plane 162 is a frontal focal plane which is oriented substantially perpendicularly to the line-of-sight 178 of the driver. The third focal plane 170 is also a frontal focal plane which is oriented substantially perpendicularly to the line-of-sight 178 of the driver. The first and third focal planes 162, 170 are dynamic focal planes which are movable in the direction of the line-of-sight 178, both in the forward direction (away from the vehicle 106) and in a rearward direction (toward the vehicle 106). The second focal plane 166 is a ground-parallel focal plane which is oriented substantially parallel to the ground surface 176, and may be disposed on the ground surface 176 such that the second focal plane 166 is a ground focal plane. The fourth focal plane 174 is also a ground-parallel focal plane which is oriented substantially parallel to the ground surface 176, and is disposed above the ground surface 176. The fourth focal plane 174 may be disposed above the ground surface 176 and the line-of-sight 178 of the driver so as to be a sky or ceiling focal plane. The second and fourth focal planes 166, 174 are static focal planes.

It is to be appreciated that though the second and fourth projectors 120, 124 are described herein as being fixedly arranged in the HUD device 102, the second and fourth projectors 120, 124 may also be mounted on actuators capable of moving the second and fourth projectors 120, 124. The actuators may be used to move the second and fourth projectors 120, 124 for the purpose of dynamically adjusting a height of the second and fourth focal planes 166, 174. When mounted in the vehicle 106, dynamically adjusting the height of the second and fourth focal planes 166, 174 may not be necessary since the height of the HUD device 102 and the driver may be fixed with respect to the ground. However, even when mounted in the vehicle 106, actuators may be used to move the second and fourth projectors 166, 174 to adjust an initial height of the second and fourth focal planes 166, 174. Additionally, actuators may be used to move the second and fourth projectors 166, 174 to adjust the height of the second and fourth focal planes 166, 174 based on a detected vertical movement of the driver's seat.

Referring to FIG. 4, the first, second, third, and fourth graphic elements 160, 164, 168, 172 may be used to present different information to the driver. The exact type of information displayed by the first, second, third, and fourth graphic elements 160, 164, 168, 172 may vary. For exemplary purposes, the first graphic element 160 and third graphic element 168 may present a warning to the driver instructing the driver to yield to a hazard or obstacle, or may present a driving instruction associated with rules of the road (e.g., a STOP sign, a YIELD sign, etc.). The second graphic element 164 and fourth graphic element 172 may present navigation instructions to the driver as a graphic overlay presented on the ground surface 176, or may present a vehicle-surrounding indicator to the driver. It is to be appreciated that the first, second, third, and fourth graphic elements 160, 164, 168, 172 may present information or graphic elements to the driver which are different than those described herein, and that only a subset of the first, second, third, and fourth graphic elements 160, 164, 168, 172 may be presented at any given time.

Returning to FIG. 1, the controller 104 may be one or more computers, (arithmetic) processors, or any other devices capable of communicating with at least one vehicle control system 180 and controlling the HUD device 102. The at least one vehicle control system 180 (hereinafter, "vehicle control system 180") may take the form(s) of any vehicle control system 180 used to actively or passively facilitate control of the vehicle 106. The vehicle control system 180 may include or communicate with one or more sensors (not shown) which detect driving and environmental conditions related to the operation of the vehicle 106.

With general reference to the operation of the HUD system 100, the controller 104 communicates with the vehicle control system 180, and based on the communication with the vehicle control system 180, determines the type and position of graphic elements to be presented to the driver of the vehicle 106. Specifically, the controller 104 determines the type of graphic element to be presented as the first, second, third, and fourth graphic elements 160, 164, 168, 172 by the first, second, third, and fourth projectors 118, 120, 122, 124, and controls the first, second, third, and fourth projectors 118, 120, 122, 124 to project the first, second, third, and fourth graphic elements 160, 164, 168, 172 as the determined graphic elements. The controller 104 also determines a target first graphic element position and a target third graphic element position as target positions at which the first and third graphic elements 160, 168 should be rendered in the environment to the driver. The controller 104 then controls the first and second actuators 156, 158 to linearly move the first and third projectors 118, 122 such that the first and third focal planes 162, 170 are moved to the target first and third graphic element positions, respectively.

Accordingly, the first projector 118 projects the first graphic element 160 on the first focal plane 162, which is oriented substantially perpendicularly to the line-of-sight of the driver, and is movable toward and away from the vehicle 106 in the direction of the line-of-sight 178 of the driver through linear movement of the first projector 118 by the first actuator 156. The second projector 120 projects the second graphic element 164 on the second focal plane 166, which is static and oriented parallel to the ground surface 176 and is disposed on the ground surface 176. The third projector 122 projects the third graphic element 168 on the third focal plane 170, which is oriented substantially perpendicularly to the line-of-sight of the driver, and is movable toward and away from the vehicle 106 in the direction of the line-of-sight 178 of the driver through linear movement of the third projector 122 by the second actuator 158. The fourth projector 124 projects the fourth graphic element 172 on the fourth focal plane 174, which is static, oriented parallel to the ground surface 176, and is disposed above the line-of-sight 178 of the driver. The controller 104 controls the first and second actuators 156, 158 to move the first and third projectors 118, 122 so as to move the first and third focal planes 162, 170.

By having the first and third projectors 118, 122 project the first and third graphic elements 160, 168 on the movable first and third focal planes 162, 170 which are oriented substantially perpendicular to the line-of-sight 178 of the driver, focus of objects at different distances from the vehicle 106 may be adjusted. This may facilitate the provision of correct depth cues to the driver for the first and third graphic elements 160, 168, especially since the HUD system 100 is a vehicular application, with the vehicle 106 serving as a moving platform.

While the second and fourth projectors 120, 124 project the second and fourth graphic elements 164, 172 on the static second and fourth focal planes 166, 174, the second and fourth focal planes 166, 174 are continuous. To make the second and fourth focal planes 166, 174 parallel to the ground surface 176, the diffuser screens 150, 154 of the second and fourth projectors 120, 124 may be tilted. Since the optical system of the HUD device 102 has very low distortion and is nearly telecentric for images in a ground-parallel focal plane, light rays are close to parallel with the optical axis, which allows the projected second and fourth graphic elements 164, 172 to be shown without distorting or changing the magnification while the second and fourth focal planes 166, 174 are tilted. The resulting second and fourth graphic elements 164, 172 therefore appear on a continuous focal plane (the second and fourth focal planes 166, 174) parallel to the ground surface 176. In this regard, the second and fourth graphic elements 164, 172 may be rendered with actual 3-dimensional volumetric shape, instead of as line segments, to add monocular cues to strengthen depth perception.

The continuous, static second and fourth focal planes 166, 174 facilitate driver depth perception with regard to the second and fourth graphic elements 164, 172. More particularly, the continuous, static second and fourth focal planes 166, 174 allow for correct generation of real images through the forward-rearward direction in 3-dimensional space (i.e., the direction of the line-of-sight 178 of the driver), allowing proper motion parallax cues to be generated. Accordingly, as the driver's head shifts from side-to-side or up-and-down, the second and fourth graphic elements 164, 172 appear to the driver to be fixed in position in the environment, rather than moving around. Consequently, the HUD system 100 does not need a head-tracking function to compensate for movement of the driver's head.

With regard to the previously-listed exemplary information which may be presented to the driver, the vehicle control system 180 may include processing and sensors capable of performing the following functions: hazard or obstacle detection; navigation; driving instruction; and vehicle surrounding (blind-spot) monitoring. It is to be appreciated that the vehicle control system 180 may also include processing and sensors capable of performing other vehicle control functions (e.g., highway merge assist, etc.), which may alternatively or additionally be tied to information presented to the driver using the HUD system 100. Regardless of the functions performed by the vehicle control system 180, it is to be appreciated that the precise manner of operation of the vehicle control system 180 to perform the functions, including the associated sensors and processing, may not be relevant to the operation of the HUD system 100. Accordingly, a description of the operation of the vehicle control system 180 is not made herein, expect for where it is relevant to the operation of the HUD system 100.

The controller 104 communicates with the vehicle control system 180, and receives therefrom inputs related to the operation of the vehicle 106 and associated with the above-listed (or other) functions. The controller 104 then controls the HUD device 102 based on the inputs received from the vehicle control system 180. In this regard, one or both of the controller 104 and the vehicle control system 180 may determine: the type of graphic element to be displayed as the first, second, third, and fourth graphic elements 160, 164, 168, 172; the location of the first, second, third, and fourth graphic elements 160, 164, 168, 172; and which of the first, second, third, and fourth graphic elements 160, 164, 168, 172 are to be displayed. The determinations may also be based on the vehicle functions employed by the driver, such as whether the driver is using the navigation function.

Regardless of which of the controller 104 and the vehicle control system 180 are used to make these determinations, the controller 104 controls the HUD device 102 to display the appropriate graphic elements in the appropriate locations. This includes controlling the first, second, third, and fourth projectors 118, 120, 122, 124 to project the appropriate first, second, third, and fourth graphic elements 160, 164, 168, 172. This also includes controlling the first and second actuators 156, 158 to linearly move the first and third projectors 118, 122, so as to move the first and third focal planes 162, 170 to the appropriate (target) positions.

In view of the previously-listed exemplary information associated with the first, second, third, and fourth graphic elements 160, 164, 168, 172, operation of the HUD system 100 will be described with reference to the vehicle 106 having the vehicle control system 180 which enables the following functions: a hazard or obstacle detection and warning function; a navigation function; a driving instruction function; and a vehicle surrounding (blind-spot) monitoring function. It is reiterated that the vehicle 106 may have a subset of these functions and/or additional functions, and that the HUD system 100 may be employed with reference to the subset or additional functions. The description of the HUD system 100 with reference to these functions is only exemplary, and these functions are only used to facilitate description of the HUD system 100. Though one or both of the controller 104 and the vehicle control system 180 may make the determinations associated with the operation of the HUD system 100, in the below description the controller 104 is described as being configured to make all of the determinations based on input received from the vehicle control system 180.

Information related to the obstacle detection and warning function may be presented to the driver as a contact-analog augmented reality graphic element projected by the first projector 118 of the HUD device 102. In this regard, the vehicle control system 180 may detect various obstacles in the roadway on which the vehicle 106 is travelling. The obstacles may include pedestrians crossing the roadway, other vehicles, animals, debris in the roadway, potholes, etc. The detection of these obstacles may be made by processing information from the environment sensed by sensors (not shown) provided on the vehicle 106. The obstacle detection may be carried out in any manner.

When an obstacle is detected, the vehicle control system 180 communicates obstacle information to the controller 104. The controller 104 receives the obstacle information from the vehicle control system 180 and determines the type of graphic element to present as the first graphic element 160 and the target first graphic element position based on the received obstacle information. While various types of graphic elements may be used, for exemplary purposes this description will assume that a "YIELD" sign is to be presented when an obstacle is detected.

To facilitate the driver's recognition of the position of the detected obstacle, the YIELD sign may be presented so as to appear on the detected obstacle. In this regard, the target first graphic element position may be determined as a position at which the first graphic element 160 should be rendered in view of the driver based on the position of the detected obstacle relative to the vehicle 106. The controller 104 then controls the first projector 118 to project the appropriate graphic element as the first graphic element 160, and controls the first actuator 156 to linearly move the first projector 118 such that the first graphic element 160 is projected on the first focal plane 162, which is positioned at the target first graphic element position. The controller 104 may also control the first actuator 156 to continuously linearly move the first projector 118 such that the first focal plane 162 moves as a distance between the vehicle 106 and the detected obstacle (i.e., the target first graphic element position) changes (detected by the vehicle control system 180 and communicated to the controller 104), for example, as a result of the vehicle 106 driving toward the detected obstacle and/or the detected obstacle moving relative to the vehicle 106.

Referring to FIG. 4, the obstacle detected by the vehicle control system 180 may be a pedestrian 182 crossing the road on which the vehicle 106 is travelling. Specifically, in the exemplary view of the driver shown in FIG. 4, the vehicle 106 is traveling on a road which is being crossed by the pedestrian 182. Accordingly, the vehicle control system 180 sends obstacle information related to the pedestrian 182 to the controller 104. Based on the obstacle information, the controller 104 determines the type of graphic element to be displayed as the first graphic element 160; in this case, a "YIELD" sign. The controller 104 then determines the target first graphic element position such that the first graphic element 160 will be projected and rendered so as to be perceived by the driver to be at a same depth as the pedestrian 182.

The controller 104 then controls the first projector 118 to project the "YIELD" sign as the first graphic element 160, and controls the first actuator 156 to linearly move the first projector 118 such that the first graphic element 160 is projected and rendered so as to be perceived by the driver (while the driver's eyes are in the eye box 116 and the driver is looking in the forward direction through the windshield 112) to be at the same depth as the pedestrian 182. Particularly, the first actuator 156 is controlled such that the first graphic element 160 is projected on the first focal plane 162, which is positioned at the target first graphic element position and is oriented substantially perpendicular to the line-of-sight 178.

As the vehicle 106 and the pedestrian 182 travel on the road, the relative distance between the two will change. This change in distance may be communicated to the controller 104 by the vehicle control system 180, the target first graphic element position may be changed accordingly, and the first actuator 156 may be controlled by the controller 104 to move the first focal plane 162 to remain at the (changed/changing) target first graphic element position. Accordingly, projecting the first graphic element 160 on the first focal plane 162 which is movable in the direction of the line-of-sight 178 of the driver, the depth cues associated with the first graphic element 160 are correctly reproduced so that the driver may accurately judge the position of the first graphic element 160, i.e., the detected obstacle.

Information related to the navigation function may be presented to the driver as a contact-analog augmented reality graphic element projected by the second projector 120 of the HUD device 102. In this regard, the vehicle control system 180 may, upon receiving a navigation request from the driver (e.g., the input of a desired location), generate a navigation route for the driver to follow to get to the desired location. The navigation route includes a set of driving directions for the driver to follow, including instructions to turn onto particular streets on the route to the desired location. The navigation function may be carried out in any manner. When the navigation function is activated, the vehicle control system 180 communicates the driving directions associated with the navigation function to the controller 104.

The controller 104 receives the driving directions from the vehicle control system 180 and determines the type of graphic element to present as the second graphic element 164. The types of graphic elements associated with the navigation function may include graphic elements which instruct the driver to continue on the current road (e.g., a straight line or arrow), to turn left or right onto an upcoming cross-road (e.g., a left/right arrow or line turning in the appropriate direction), to enter, merge onto, or exit from a highway (e.g., a line or arrow indicating the appropriate path), etc. The controller 104 selects the appropriate graphic element to present as the second graphic element 164 based on the driving direction communicated from the vehicle control system 180.

Referring to the exemplary view of the driver shown in FIG. 4, the driving direction for the driving route determined by the navigation function of the vehicle control system 180 includes a left-hand turn onto an upcoming street. Accordingly, the controller 104 controls the second projector 120 to generate and project a left-hand turn graphic element as the second graphic element 164 on the second focal plane 166. As shown in FIG. 4, the second focal plane 166 is oriented parallel to the ground surface 176 and is disposed on the ground surface 176. As noted above, the second projector 120 is fixedly arranged in the HUD device 102, such that the second focal plane 166 is static. As also noted above, the second focal plane 166 is continuous, such that the second graphic element 164 is rendered to the driver with appropriate depth cues and as a 3-dimensional image.

Information related to the driving instruction function may be presented to the driver as a contact-analog augmented reality graphic element projected by the third projector 122 of the HUD device 102. In this regard, the vehicle control system 180 may use sensors and/or information stored in a database and associated with a map to monitor the road on which the vehicle 106 is traveling, and to determine upcoming driving instructions associated with travel on that road. For example, the vehicle control system 180 may detect an upcoming required stop, yield, or other condition (hereinafter, collectively referenced as "road condition") on the road on which the vehicle 106 is traveling. The vehicle control system 180 may then also determine a driving instruction associated with the detected road condition (e.g., a stop instruction associated with a stop road condition, etc.). The driving instruction function may be carried out in any manner, the specifics of which are not relevant to the operation of the HUD system 100.

The vehicle control system 180 communicates the road condition and/or the driving instructions associated with the road condition, as well as information related to a position of the road condition, to the controller 104. The controller 104 then controls the third projector 122 to project the third graphic element 168 to communicate information to the driver related to the road condition and/or associated driving instruction. The controller 104 receives the road condition and/or driving instruction information, as well as the position information, from the vehicle control system 180, and determines the type of graphic element to present as the third graphic element 168 and a target third graphic element position.

Various types of graphic elements may be used in conjunction with the driving instruction functions, for example: a STOP sign, a YIELD sign, a ONE WAY sign, a NO TURN ON RED sign, etc. The type of graphic element may be selected to communicate the driving instruction associated with the road condition. Whichever type of graphic element the controller 104 determines should be used as the third graphic element 168, that graphic element may be projected so as to appear at the location of the driving condition. In this regard, the target third graphic element position may be determined as a position at which the third graphic element 168 should be rendered in view of the driver based on the position of the detected road condition relative to the vehicle 106.

The controller 104 then controls the third projector 122 to project the appropriate graphic element as the third graphic element 168. The controller also controls the second actuator 158 to linearly move the third projector 122 such that the third graphic element 168 is projected and rendered so as to be perceived by the driver (while the driver's eyes are in the eye box 116 and the driver is looking in the forward direction through the windshield 112) to be at the same depth as the road condition. Particularly, the second actuator 158 is controlled such that the third graphic element 168 is projected on the third focal plane 170, which is positioned at the target third graphic element position and is oriented substantially perpendicularly to the line-of-sight 178. The controller 104 may also control the second actuator 158 to continuously linearly move the third projector 122 such that the third focal plane 170 moves as a distance between the vehicle 106 and the detected road condition (i.e., the target third graphic element position) changes (as detected by the vehicle control system 180 and communicated to the controller 104), for example, as a result of the vehicle 106 driving toward the detected road condition.

In the exemplary view of the driver shown in FIG. 4, the vehicle 106 is approaching a four-way intersection at which the vehicle 106 should stop. Accordingly, the vehicle control system 180 detects the stop road condition at a position of an entrance of the intersection, and determines the driving instruction associated with the stop road condition to be a stop instruction. The stop road condition and/or instruction, as well as the position of the stop road condition, is communicated to the controller 104, which determines that a STOP sign should be presented as the third graphic element 168. The controller 104 also determines that the third graphic element 168 (i.e., the STOP sign) should appear at the position of the entrance of the four-way intersection. The position of the entrance of the intersection is therefore determined to be the target third graphic element position.

The controller 104 then controls the third projector 122 to project the "STOP" sign as the third graphic element 168, and controls the second actuator 158 to move the third projector 122 such that the third graphic element 168 is projected and rendered so as to be perceived by the driver (while the driver's eyes are in the eye box 116 and the driver is looking in the forward direction through the windshield 112) to be at the same depth as the entrance of the four-way intersection. Particularly, the second actuator 158 is controlled such that the third graphic element 168 is projected on the third focal plane 170, which is positioned at the target third graphic element position and is oriented substantially perpendicularly to the line-of-sight 178. As the vehicle 106 travels on road, the relative distance between the vehicle 106 and the entrance of the four-way intersection will change. This change in distance may be communicated to the controller 104 by the vehicle control system 180, the target third graphic element position may be changed accordingly, and the second actuator 158 may be controlled by the controller 104 to move the third focal plane 170 to remain at the (changed/changing) target third graphic element position. Accordingly, projecting the third graphic element 168 on the third focal plane 170 which is movable in the direction of the line-of-sight 178 of the driver, the depth cues associated with the third graphic element 168 are correctly reproduced so that the driver may accurately judge the position of the third graphic element 168, i.e., the detected road condition.

Information related to the vehicle surrounding (blind-spot) monitoring function may be presented to the driver by the fourth projector 124 of the HUD device 102. In this regard, the vehicle control system 180 may detect the existence of other vehicles in an area immediately surrounding the vehicle 106. The detection of the other vehicles immediately surrounding the vehicle 106 may be made by processing information regarding the surroundings of the vehicle 106 sensed by sensors (not shown) provided on the vehicle 106. The vehicle surrounding determination may be carried out in any manner.

The vehicle surrounding information is determined by the vehicle control system 180 and communicated to the controller 104. The controller 104 receives the vehicle surrounding information from the vehicle control system 180 and determines how, if at all, to modify the fourth graphic element 172 projected on the fourth focal plane 174. In this regard, the graphic element used as the fourth graphic element 172 to facilitate the vehicle surrounding (blind-spot) monitoring function may be a vehicle surrounding indicator, shown in FIG. 4.

The vehicle surrounding indicator includes a central marker representing the vehicle 106 and eight surrounding markers representing positions immediately surrounding the vehicle 106. The vehicle control system 180 communicates information about the positions of vehicles in the immediate surroundings of the vehicle 106, and the controller 104 controls the fourth projector 124 to change the fourth graphic element 172 such that the associated one or more of the eight surrounding markers are highlighted. The highlighting of the eight surrounding markers indicates to the driver the position of other vehicles in the immediate surroundings of the vehicle 106.

As shown in FIG. 4, the fourth graphic element 172 is projected on the fourth focal plane 174, which is oriented parallel to the ground surface 176 and is disposed above the ground surface 176 and the line-of-sight 178. As noted above, the fourth projector 124 is fixedly arranged in the HUD device 102, such that the fourth focal plane 174 is static. As also noted above, the fourth focal plane 174 is continuous, such that the fourth graphic element 172 is rendered to the driver with appropriate depth cues and as a 3-dimensional image.

It is to be appreciated that the fourth graphic element 172 may be presented in a form different than the vehicle surrounding indicator shown in FIG. 4. In any event, the fourth graphic element 172 is projected onto the fourth focal plane 174, which is oriented parallel to the ground surface 176 and is disposed above the ground surface 176 and the line-of-sight 178 of the driver. Accordingly, the fourth graphic element 172 is provided on the sky focal plane, which may be appropriate since the information communicated by the fourth graphic element 172 need not interact with the environment.

The above-described HUD system 100 can project graphic elements, some of which as contact-analog augmented reality graphic elements, at continuously changing focal distances as well as in ground-parallel focal planes with continuous changing focus from front-to-back in the direction of the line-of-sight 178 of the driver. Accordingly, depth perception cues may be improved, to facilitate focus and increase the attention the driver pays to the environment while simultaneously (or near-simultaneously) also observing the information presented via the graphic elements in view of the driver. In this regard, through experimentation, the inventors have determined that spatial perception is greatly influenced by focal cues, and that the focal plane adjusting capability, as well as the capability to show graphic elements on continuous, static ground-parallel focal planes, of the herein-described HUD system 100 improves spatial perception. To this point, a greater improvement in spatial perception is observed when adjusting the focal cues as described herein, than is observed when adjusting a size of a graphic element.

The configuration of the HUD device 102, particularly the use of the beam splitters 126, 130, 134 and lenses 128, 132, 136, 138, allows the HUD device 102 to have a relatively compact size. Furthermore, the lenses 128, 132, 136, 138 allow a range of depth to expand from a few meters in front of the vehicle 106 to infinity within the physical space allocated for the optics of the HUD device 102. Further still, the beam splitters 126, 130, 134 are used as optical combiners to merge all of the disparate sets of projected rays from the first, second, third, and fourth projectors 118, 120, 122, 124 through the lenses 128, 132, 136, 138 so as to combine separate images from the first, second, third, and fourth projectors 118, 120, 122, 124 into one unified image projected in view of the driver.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

For example, fewer or more projectors may be used in the HUD system 100 to project fewer or more graphic elements. Furthermore, while the HUD system 100 is described as having two projectors which project graphic elements in frontal focal planes and two projectors which project graphic elements in ground-parallel focal planes, the proportion of frontal and ground-parallel focal planes may be changed. As described above, all projectors in the HUD system 100 (even if fewer or greater than four projectors are provided) may be mounted in the HUD device 102 via an actuator which may dynamically adjust the position of the focal plane (depth or height). It is also reiterated that the above-described vehicle functions associated with the HUD system 100 are exemplary, and may be changed or modified.

Further still, the mechanism by which the frontal focal planes are moved may be modified from that described above. For example, rather than moving the entire projector (e.g., the first and third projectors 118, 122 using the first and second actuators 156, 158), only the diffuser screens (e.g., the diffuser screens 148, 152 of the first and third projectors 118, 122) may be moved relative to the respective projector units (e.g., the projector units 140, 144).

Additionally, while the HUD system 100 has been described with reference to the vehicle 106, which is a four-wheeled automobile for outdoor use, the HUD system 100 may be used in different types of vehicle. For example, the HUD system may be provided in a marine vehicle (a boat), an air vehicle (an airplane or jet), or a vehicle intended for indoor use (e.g., a transportation cart, a vehicle used for material handling, such as a fork lift, etc.).

The HUD system 100 may also be provided as part of a stationary unit to provide a three-dimensional volumetric viewing device in a room (the HUD system 100 does not need to exist on a moving platform). To this point, the configuration shown in FIG. 2 may be considered to be that of a stationary base, rather than of the vehicle 106. In such a configuration, the "driver" referenced above would be a "user", and the "windshield 112" would be a display screen. Furthermore, the controller 104 may communicate with any associated control system, rather than the vehicle control system 180. It is noted that even when the HUD system 100 is provided outside of a vehicle, the position of the user's eyes (i.e., the eye box 116) may still be considered to be constrained relative to the display screen. For example, HUD system 100 may be provided in a stationary base including a seat which may be substantially fixed relative to the display screen (or movable within a predetermined or known range).

The graphic elements are described above as being static images. However, the graphic elements may be animated. Particularly, the graphic elements may be animated in position, size, color, transparency, etc.

The invention claimed is:

1. A vehicle heads-up display device for displaying graphic elements in view of a driver of a vehicle while the driver views an environment through a windshield of the vehicle, comprising:
   a first projector configured to project, through the windshield of the vehicle, a first graphic element on a first focal plane in view of the driver while the driver views the environment through the windshield, the first focal plane oriented substantially perpendicularly to a line-of-sight of the driver; and
   a first actuator on which the first projector is mounted, the first actuator configured to linearly move the first projector in a direction towards or away from at least one lens, wherein linearly moving the first projector causes the first focal plane of the first graphic element to move in a direction of the line-of-sight of the driver, wherein the first actuator is configured to linearly move the first projector in a direction substantially perpendicular to the line-of-sight of the driver such that the first focal plane is moved substantially perpendicularly to the direction of movement of the first projector.

2. The vehicle heads-up display device according to claim 1, further comprising:
   a second projector configured to project a second graphic element on a second focal plane in view of the driver while the driver views the environment through the windshield, the second focal plane oriented substantially parallel to a ground surface,
   wherein the second projector is fixedly arranged such that the second focal plane of the second graphic element is static.

3. The vehicle heads-up display device according to claim 2, further comprising:

a third projector configured to project a third graphic element on a third focal plane in view of the driver while the driver views the environment through the windshield, the third focal plane oriented substantially perpendicularly to the direction of the line-of-sight of the driver;

a second actuator on which the third projector is mounted, the second actuator configured to linearly move the third projector, wherein linearly moving the third projector causes the third focal plane of the third graphic element to move in the direction of the line-of-sight of the driver; and a fourth projector configured to project a fourth graphic element on a fourth focal plane in view of the driver, the fourth focal plane oriented substantially parallel to and above the ground surface, wherein the fourth projector is fixedly arranged such that the fourth focal plane of the fourth graphic element is static, and the second projector is configured to project the second graphic element such that the second focal plane is disposed on the ground surface.

4. The vehicle heads-up display device according to claim 3, wherein the first actuator and the second actuator are independently operable to move the first projector and the third projector, such that the first focal plane and the third focal plane are movable independently of one another.

5. The vehicle heads-up display device according to claim 3, further comprising:
a central beam splitter into which projections from each of the first projector, the second projector, the third projector, and the fourth projector are received and combined into a singular projection output; and
the at least one lens disposed to receive the singular projection output from the central beam splitter, and to direct the singular projection output to an associated display screen in view of the driver.

6. The vehicle heads-up display device according to claim 2, further comprising:
a central beam splitter into which projections from each of the first projector and the second projector are received and combined into a singular projection output; and
the at least one lens disposed to receive the singular projection output from the central beam splitter, and to direct the singular projection output to an associated display screen in view of the driver.

7. The vehicle heads-up display device according to claim 1, wherein the graphic elements include at least one contact-analog augmented reality graphic element.

8. The vehicle heads-up display device according to claim 1, further comprising a controller configured to:
communicate with at least one associated vehicle control system;
determine a target first graphic element position based on communication with the at least one associated vehicle control system; and
control the first actuator to linearly move the first projector such that the first focal plane moves to the target first graphic element position.

9. A vehicular heads-up display system, comprising:
a vehicle heads-up display device for displaying graphic elements in view of a driver of a vehicle while the driver views an environment through a windshield of the vehicle, the vehicle heads-up display device comprising:
a first projector configured to project a first graphic element on a first focal plane in view of the driver, the first focal plane oriented substantially perpendicularly to a line-of-sight of the driver, and the first projector configured to move the first focal plane in a direction of the line-of-sight of the driver; and
a second projector configured to project a second graphic element on a second focal plane in view of the driver, the second focal plane being static and oriented substantially parallel to a ground surface, and
a controller configured to communicate with at least one associated vehicle control system and to control the vehicle heads-up display device to display the first and second graphic elements based on communication with the at least one associated vehicle control system.

10. The heads-up display system according to claim 9, wherein the controller is configured to:
determine a target first graphic element position based on communication with the at least one associated vehicle control system; and
control the first projector to move the first focal plane to the target first graphic element position.

11. The heads-up display system according to claim 10, wherein the vehicle heads-up display device further comprises:
an actuator on which the first projector is mounted, the actuator configured to linearly move the first projector, wherein linearly moving the first projector causes the first focal plane to move in the direction of the line-of-sight of the driver, and
the controller is configured to control the actuator to linearly move the first projector such that the first focal plane moves to the target first graphic element position.

12. The heads-up display system according to claim 9, wherein the vehicle heads-up display device further comprises:
a third projector configured to project a third graphic element on a third focal plane in view of the driver, the third focal plane oriented substantially perpendicularly to the line-of-sight of the driver, and the third projector configured to move the third focal plane in the direction of the line-of-sight of the driver; and
a fourth projector configured to project a fourth graphic element on a fourth focal plane in view of the driver, the fourth focal plane being static and oriented parallel to the ground surface and disposed above the ground surface, wherein the second projector is configured to project the second graphic element with the second focal plane disposed on the ground surface, and
the controller is configured to control the vehicle heads-up display device to display the first, second, third, and fourth graphic elements based on communication with the at least one associated vehicle control system.

13. The heads-up display system according to claim 12, wherein the controller is configured to:
determine a target first graphic element position based on communication with the at least one associated vehicle control system;
determine a target third graphic element position based on communication with the at least one associated vehicle control system; and
control the first projector to move the first focal plane to the target first graphic element position, and control the third projector to move the third focal plane to the target third graphic element position.

14. The heads-up display system according to claim 13, wherein the vehicle heads-up display device further comprises:
a first actuator on which the first projector is mounted, the first actuator configured to linearly move the first projector, wherein linearly moving the first projector causes the first focal plane to move in the direction of the line-of-sight of the driver; and a second actuator on which the third projector is mounted, the second actuator configured to linearly move the third projector, wherein linearly moving the third projector causes the third focal plane to move in the direction of the line-of-sight of the driver, and the controller is configured to control the first and second actuators to linearly move the first and third projectors such that the first and third focal planes respectively move to the target first graphic element position and the target third graphic element position, and the controller is configured to control the first and second actuators independently of one another.

15. The heads-up display device according to claim 12, wherein the vehicle heads-up display device further comprises:

a first actuator on which the first projector is mounted, the first actuator configured to linearly move the first projector, wherein linearly moving the first projector causes the first focal plane to move in the direction of the line-of-sight of the driver; and a second actuator on which the third projector is mounted, the second actuator configured to linearly move the third projector, wherein linearly moving the third projector causes the third focal plane to move in the direction of the line-of-sight of the driver, and the controller is configured to control the first and second actuators to linearly move the first and third projectors such that the first and third focal planes respectively move, and the controller is configured to control the first and second actuators independently of one another.

16. The heads-up display device according to claim 9, wherein the vehicle heads-up display device further comprises:

a first actuator on which the first projector is mounted, the first actuator configured to linearly move the first projector, wherein linearly moving the first projector causes the first focal plane to move in the direction of the line-of-sight of the driver, and the controller is configured to control the first actuator to linearly move the first projector such that the first focal plane moves.

17. A method for presenting augmented reality graphic elements in a vehicle heads-up display, comprising:

projecting, through a windshield of a vehicle, a first graphic element on a first focal plane in view of a driver, the first focal plane oriented substantially perpendicularly to a line-of-sight of the driver;

projecting, through the windshield of the vehicle, a second graphic element on a second focal plane in view of the driver, the second focal plane being static and oriented substantially parallel to a ground surface; and moving the first focal plane in a direction of the line-of-sight of the driver by linearly moving a projector which projects the first graphic element in a direction towards or away from at least one lens, the linear movement of the projector causes the movement of the first focal plane in the direction of the line-of-sight of the driver, wherein the first focal plane is moved substantially perpendicularly to the direction of movement of the projector.

18. The method according to claim 17, further comprising:

receiving an input from at least one associated vehicle control system;

determining a target position of the first graphic element based on the input received from the at least one associated vehicle control system; and moving the first focal plane in the direction of the line-of-sight of the driver such that the first focal plane moves to the target position of the first graphic element.

19. The method according to claim 17, wherein the first focal plane is moved relative to a vehicle in the line-of-sight direction of a driver extending from the driver through the windshield of the vehicle.

20. The method according to claim 17, further comprising:

projecting a third graphic element on a third focal plane in the view of the driver, the third focal plane oriented substantially perpendicularly to the line-of-sight of the driver;

projecting a fourth graphic element on a fourth focal plane in view of the driver, the fourth focal plane being static and oriented substantially parallel to and above the ground surface, wherein the second graphic element is projected with the second focal plane disposed on the ground surface; and moving the third focal plane in the direction of the line-of-sight of the driver, wherein the first focal plane and third focal plane are moved independently from one another.

* * * * *